(12) United States Patent
Smith et al.

(10) Patent No.: US 6,690,994 B1
(45) Date of Patent: Feb. 10, 2004

(54) SYSTEM AND METHOD FOR RECOVERING AN AUTOMATED ROBOTIC DEVICE IN A DATA STORAGE LIBRARY

(75) Inventors: Frank T. Smith, Nederland, CO (US); Timothy C. Ostwald, Louisville, CO (US); David C. Black, Thornton, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/127,303

(22) Filed: Apr. 22, 2002

(51) Int. Cl.$^7$ ................................................. G06F 7/00
(52) U.S. Cl. ...................... 700/218; 700/248; 700/255; 700/214; 906/6; 906/8
(58) Field of Search ................. 700/214, 218, 700/248, 255; 901/6, 8; 906/6, 8

(56) References Cited

U.S. PATENT DOCUMENTS

| | | | |
|---|---|---|---|
| 3,733,446 A | | 5/1973 | Colovas et al. |
| 4,901,246 A | * | 2/1990 | Meyer et al. ............... 700/255 |
| 4,928,245 A | | 5/1990 | Moy et al. |
| 4,941,103 A | * | 7/1990 | Kato .......................... 700/248 |
| 4,945,429 A | | 7/1990 | Munro et al. |
| 5,019,762 A | * | 5/1991 | Kato .......................... 700/247 |
| 5,128,912 A | * | 7/1992 | Hug et al. ................ 369/30.61 |
| 5,297,484 A | | 3/1994 | Piserchia et al. |
| 5,333,982 A | | 8/1994 | Tanizawa et al. |
| 5,429,470 A | | 7/1995 | Nicol et al. |
| 5,690,197 A | | 11/1997 | Suganuma et al. |
| 5,700,125 A | | 12/1997 | Falace et al. |
| 5,818,723 A | * | 10/1998 | Dimitri ....................... 700/214 |
| 5,870,245 A | | 2/1999 | Kersey et al. |
| 5,927,464 A | | 7/1999 | Clark et al. |
| 5,993,222 A | | 11/1999 | Nicolette et al. |
| 6,011,669 A | | 1/2000 | Apple et al. |
| 6,025,972 A | | 2/2000 | Schmidtke et al. |
| 6,038,490 A | * | 3/2000 | Dimitri et al. .............. 700/214 |
| 6,059,509 A | | 5/2000 | Ostwald |
| 6,068,436 A | | 5/2000 | Black et al. |
| 6,085,123 A | * | 7/2000 | Baca et al. .................. 700/214 |
| 6,109,568 A | | 8/2000 | Gilbert et al. |
| 6,161,058 A | * | 12/2000 | Nishijo et al. .............. 700/218 |
| 6,309,162 B1 | | 10/2001 | White |
| 6,327,519 B1 | * | 12/2001 | Ostwald et al. ............. 700/245 |
| 6,480,759 B1 | * | 11/2002 | Ostwald et al. ............. 700/245 |
| 6,493,604 B1 | * | 12/2002 | Kappel et al. .............. 700/213 |

* cited by examiner

*Primary Examiner*—Richard Ridley
(74) *Attorney, Agent, or Firm*—Brooks Kushman P.C.

(57) ABSTRACT

A system and method for recovering an inoperable automated robotic device in a data storage library having multiple cells for holding data storage media for use in storing data, and multiple automated robotic devices for use in retrieving data storage media from the cells. An engager is operatively connected to a first robotic device, and a receptacle adapted to receive the engager is formed in a second robotic device. When the second automated robotic device becomes inoperable, the first robotic devices is driven to a position near the second robotic device so that the engager is received by the receptacle and the first robotic device is operable to drive the second robotic device to a recovery location.

27 Claims, 6 Drawing Sheets

SYSTEM AND METHOD FOR RECOVERING AN AUTOMATED ROBOTIC DEVICE IN A DATA STORAGE LIBRARY

BACKGROUND OF THE INVENTION

1. Field of the Invention

The present invention relates to a system and method for recovering an inoperable automated robotic device in a data storage library.

2. Background

Current automated libraries for data storage typically include arrays of multiple storage cells for use in housing data storage media, as well as devices for recording and retrieving data from such media. For example, in such a library, automated robotic devices may be used to move magnetic tape cartridges between the various storage cells and tape drives within the libraries.

Indeed, in such automated library architectures, many separate automated robotic devices may be used to perform the jobs of fetching and retrieving cartridges in the library. For this purpose, these automated robotic devices typically include a hand-like mechanism, which may be referred to as a "gripper," for grasping and holding a cartridge. Also for this purpose, these automated robotic devices, which may be referred to as "handbots" or "pickers," may be adapted to move or ride along one or more rails located adjacent to the storage cells so that the robotic device can gain access to the cartridges in those cells.

To improve library efficiency, multiple robotic devices may be positioned in a library so as to have overlapping access to at least some portion of the storage cells, such as by being positioned to move or ride along the same rails. Robotic devices positioned in this fashion may be referred to as redundant, in that they each have access to the same or substantially the same storage cells in a library. In such a fashion, particularly in large libraries having many storage cells, a single robotic device need not travel large distances within the library. Instead, two or more robotic devices can cover overlapping portions of the storage cells, thereby providing for more efficient use of the library.

However, as a result of such redundancy, if one such robotic devices fails or becomes inoperative, in that it cannot travel along the rails, it can block the access of a redundant robotic device to one or more desired cell locations. The inoperative robotic device therefore must be removed from the area to enable the functional redundant robotic device to complete any intended jobs. Alternatively, even where some portion of the storage cells in the library are accessed by only one robotic device, if that robotic device fails or becomes inoperative, those storage cells become inaccessible, i.e., there is no robotic device available to access those storage cells. In either case, repair, removal and/or replacement of such an inoperative robotic device requires manual user intervention, which can cause significant down-time for a library.

Thus, there exists a need for a system and method for recovering an inoperable automated robotic device in a data storage library. Preferably, such a system and method would utilize an operative automated robotic device in order to move and recover such an inoperable robotic device. Such a system and method would thereby allow for automated recovery of such an inoperative robotic device, thus decreasing library down-time while restoring full library function.

SUMMARY OF THE INVENTION

Accordingly, the present invention provides for a system and method for recovering an inoperable automated robotic device in a data storage library.

According to the present invention, then, in a data storage library having a plurality of cells for holding data storage media for use in storing data, and a plurality of automated robotic devices for use in retrieving data storage media from the plurality of cells, a system is provided for recovering an inoperable automated robotic device. The system comprises an engager operatively connected to a first one of the plurality of automated robotic devices, and a receptacle formed in a second one of the plurality of automated robotic devices and adapted to receive the engager. When the second one of the plurality of automated robotic devices becomes inoperable, the first one of the plurality of automated robotic devices is driven to a position proximate the second one of the plurality of automated robotic devices so that the engager is received by the receptacle and the first one of the plurality of automated robotic devices is operable to drive the second one of the plurality of automated robotic devices to a recovery location.

Also according to the present invention, in a data storage library having a plurality of cells for holding data storage media for use in storing data, and a plurality of automated robotic devices for use in retrieving data storage media from the plurality of cells, a method is provided for recovering an inoperable automated robotic device. The method comprises providing an engager operatively connected to a first one of the plurality of automated robotic devices. When a second one of the plurality of automated robotic devices becomes inoperable, the first one of the plurality of automated robotic devices is driven to a position proximate the second one of the plurality of automated robotic devices so that the engager contacts the second one of the plurality of automated robotic devices and the first one of the plurality of automated robotic devices is operable to drive the second one of the plurality of automated robotic devices to a recovery location.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
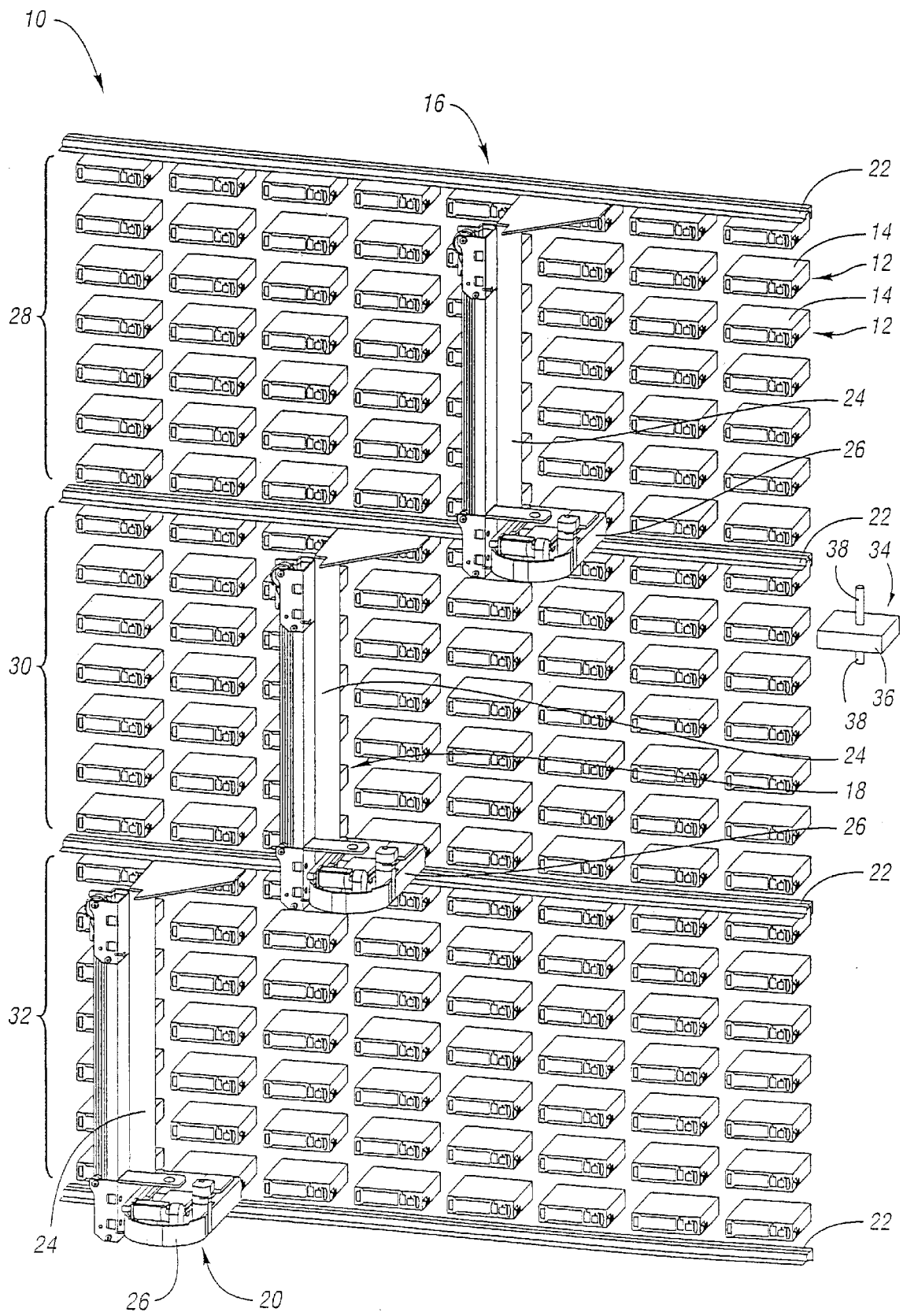
FIG. 1 is a partial perspective view of one embodiment of the present invention for recovering an automated robotic device in an exemplary tape cartridge library.

With reference to the Figures, the preferred embodiments of the present invention will now be described in greater detail. As previously noted, current automated libraries for data storage typically include arrays of multiple storage cells for use in housing data storage media, as well as devices for recording and retrieving data from such media. For example, in such a library, automated robotic devices may be used to move magnetic tape cartridges between the various storage cells and tape drives within the libraries.

Indeed, in such automated library architectures, many separate automated robotic devices may be used to perform the jobs of fetching and retrieving cartridges in the library. For this purpose, these automated robotic devices typically include a hand-like "gripper" mechanism for grasping and holding a cartridge. Also for this purpose, these automated robotic devices, "handbots," or "pickers," may be adapted to move or ride along one or more rails located adjacent to the storage cells so that the robotic device can gain access to the cartridges in those cells.

As also previously noted, to improve efficiency, multiple robotic devices may be positioned in a library so as to have overlapping access to at least some portion of the storage cells, such as by being positioned to move or ride along the same rails. Robotic devices positioned in this fashion may be referred to as redundant, in that they each have access to the same or substantially the same storage cells in a library. In such a fashion, particularly in large libraries having many storage cells, a single robotic device need not travel large distances within the library. Instead, two or more robotic devices can cover overlapping portions of the storage cells, thereby providing for more efficient use of the library.

However, as a result of such redundancy, if one such robotic devices fails or becomes inoperative, in that it cannot travel along the rails, it can block the access of a redundant robotic device to one or more desired cell locations. The inoperative robotic device therefore must be removed from the area to enable the functional redundant robotic device to complete any intended jobs. Alternatively, even where some portion of the storage cells in the library are accessed by only one robotic device, if that robotic device fails or becomes inoperative, those storage cells become inaccessible, i.e., there is no robotic device available to access those storage cells. In either case, repair, removal and/or replacement of such an inoperative robotic device requires manual user intervention, which can cause significant down-time for a library.

Thus, there exists a need for a system and method for recovering an inoperable automated robotic device in a data storage library. Preferably, such a system and method would utilize an operative automated robotic device in order to move and recover such an inoperable robotic device. Such a system and method would thereby allow for automated recovery of such an inoperative robotic device, thus decreasing library down-time while restoring full library function.

Referring now to FIG. 1, a partial perspective view of one embodiment of the system and method of the present invention for recovering an automated robotic device in an exemplary tape cartridge library is shown. As seen therein, a portion of an automated library for tape cartridges is denoted generally by reference numeral 10. Library (10) preferably includes arrays of multiple storage cells (12) for use in housing tape cartridges (14), as well as multiple tape drives (not shown). It should be noted that, although specifically described herein for use in a tape cartridge library, the system and method of the present invention may be used in any type of data storage library having automated robotic devices for use in moving any type of data storage media and/or data storage devices.

As previously noted, in such a library (10), automated robotic devices (16, 18, 20) may be used to move tape cartridges (14) between various storage cells (12) and tape drives (not shown). In that regard, guide rails (22) are preferably provided on which robotic devices (16, 18, 20) ride. Each of robotic devices (16, 18, 20) preferably comprises a chassis (24) adapted to be mounted on rails (22) so that the robotic devices (16, 18, 20) may move along the length of rails (22), in this case substantially horizontally. Each of robotic devices (16, 18, 20) also preferably comprises a gripper (26) for grasping and holding cartridges (14) or tape drives (not shown). Each gripper (26) is preferably adapted to move along the length of its associated chassis (24), in this case substantially vertically. As is readily apparent, then, each of robotic device (16, 18, 20) is preferably movable in at least two dimensions in order to gain access to cartridges (14) in the arrays of storage cells (12).

It should be noted that robotic devices (16, 18, 20) may each be provided with a battery to power a motor (not shown) in the robotic device (16, 18, 20) such that it may be driven along rails (22) or, preferably, rails (22) are provided with conductors (not shown) used to provide electric power to such motors (not shown) on the robotic devices (16, 18, 20) by means of conductive brushes or wheels on the robotic devices (16, 18, 20). The preferred embodiments of such power distribution are disclosed in U.S. patent application Ser. No. 10/033,944, entitled "Power Strip Distribution System and Method for an Automated Robotic Device in a Data Storage System," and Ser. No. 10/034,972, entitled "Power Rail Distribution System and Method for an Automated Robotic Device in a Data Storage System," each of which are assigned to the assignee of the present application and are hereby incorporated by reference.

In such a fashion, robotic device (16) is provided access to tape cartridges (14) stored in cells (12) in an upper portion (28) of library (10), robotic device (18) is provided access to tape cartridges (14) stored in cells (12) in a middle portion (30) of library (10), and robotic device (20) is provided access to tape cartridges (14) stored in cells (12) in a lower portion (32) of library (10). Thus, as can be seen from FIG. 1, upper, middle and lower portions (28, 30, 32) of library (10) to which robotic devices (16, 18, 20) have access, respectively, are preferably separate and distinct, or mutually exclusive.

To provide for the redundancy and increased library efficiency described above, each of upper, middle and lower portions (28, 30, 32) of library (10) may have one or more other robotic devices (not shown) in addition to robotic devices (16, 18, 20). However, as also previously described, with such redundancy, if any of robotic devices (16, 18, 20) should fail or become inoperable, that robotic device (16, 18, 20) would block access of any such additional robotic devices (not shown) to the storage cells (12) and tape cartridges (14) in that portion (28, 30, 32) of library (10). For example, if robotic device (16) were to become inoperable, any additional robotic device or devices (not shown) provided on rails (22) so as to have access to tape cartridges (14) in storage cells (12) in the upper portion (28) of library (10) would be blocked by robotic device (16) from full access to upper portion (28) of library (10).

Alternatively, even where robotic devices (16, 18, 20) are the only such robotic devices provided for accessing the storage cells (12) and tape cartridges (14) in the upper, middle, and lower portions (28, 30, 32), respectively, of library (10), if any such robotic device (16, 18, 20) fails or becomes inoperative, the storage cells (12) and tape cartridges (14) in the corresponding portion (28, 30, 32) of library (10) become inaccessible, i.e., there is no robotic device available to access those storage cells. For example, if robotic device (16) were to become inoperable, the storage cells (12) and tape cartridges (14) in upper portion (28) of library (10) become inaccessible.

The present invention solves this problem by providing for recovery of such an inoperable robotic device (16) by an operable robotic device (18) in an immediately adjacent portion (30) of library (10). More specifically, in one embodiment of the present invention, at least one storage cell (12) in each portion (28, 30, 32) of library (10) is preferably used to house an engager (34). As seen in FIG. 1, engager (34) comprises a base (36) adapted to be gripped by a gripper (26), and an engagement member (38), which is preferably a pin, attached to the base (36).

Figure 2:
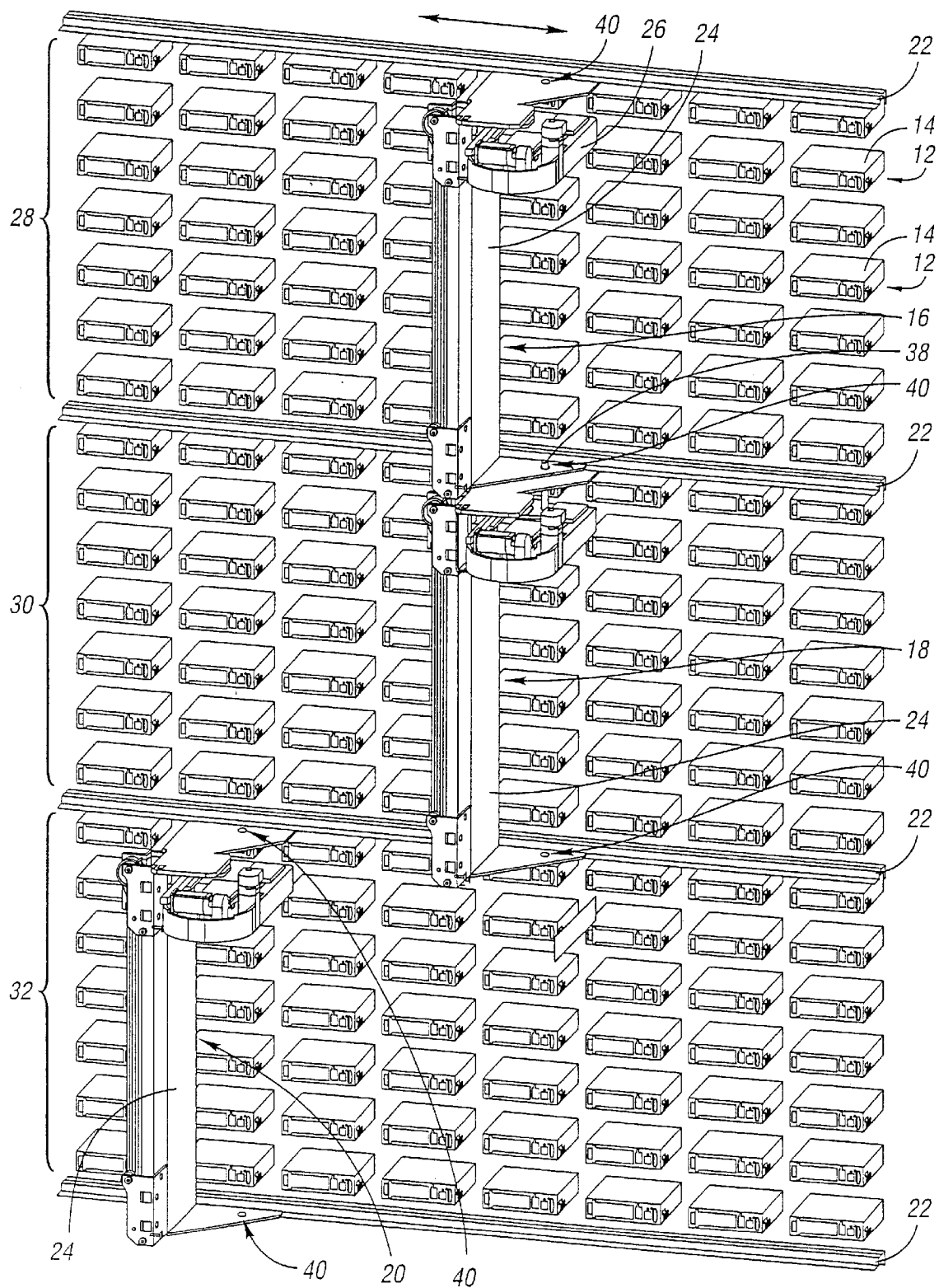
FIG. 2 is another partial perspective view of the embodiment of FIG. 1 depicting recovery of an inoperable robotic device according to the present invention.

Referring now to FIG. 2, another partial perspective view of the embodiment of FIG. 1 is shown, this time depicting recovery of an inoperable robotic device according to the present invention. For such recovery, where robotic device (16) in the upper portion (28) of library (10) has become inoperable, robotic device (18) first moves to the appropriate storage cell (12) in the middle portion (30) of library (10) and retrieves engager (34) using its gripper (26). Robotic device (18) then moves to a position in the middle portion (30) of library (10) proximate inoperable robotic device (16) in the upper portion (28) of library (10) in order to recover inoperable robotic device (16).

Figure 3:
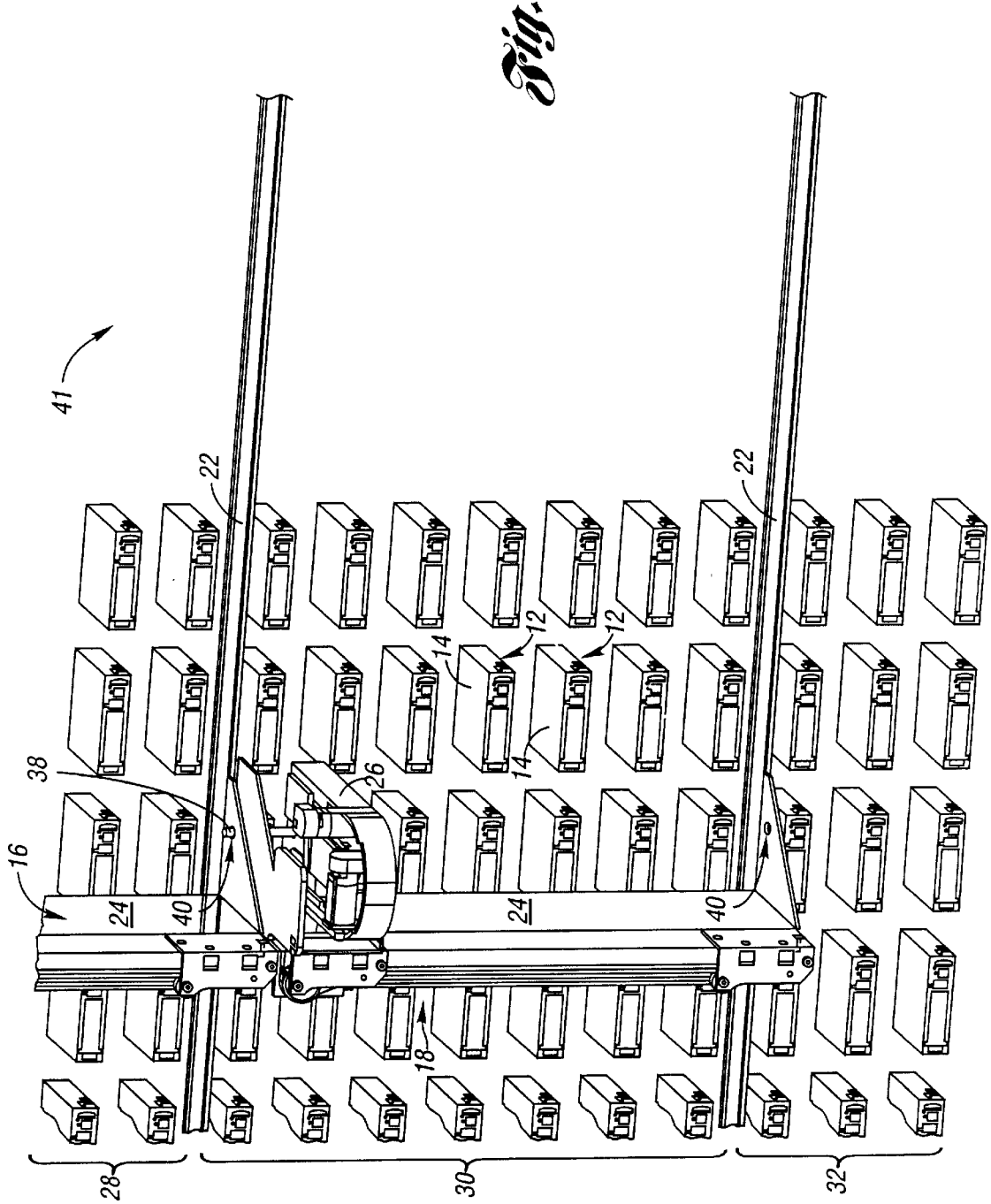
FIG. 3 is a more detailed perspective view of the embodiment of FIG. 1 depicting recovery of an inoperable robotic device according to the present invention.

In that regard, FIG. 3 shows a more detailed perspective view of the embodiment of FIG. 1, again depicting recovery of an inoperable robotic device according to the present invention. As seen therein, and with continuing reference to FIG. 2, chassis (24) of robotic device (18) first moves horizontally along rails (22) to a position in middle portion (30) of library (10) immediately below inoperable robotic device (16) in upper portion (28) of library (10). Inoperable robotic device (16) is preferably provided in the chassis (24) thereof with a receptacle (40), which is preferably a pin hole, adapted to receive engagement member (38) of engager (34). As a result, holding the engager (34), gripper (26) of robotic device (18) is preferably moved vertically along its chassis (24) so that the pin (38) of engager (34) is received in the pin hole (40) in the chassis (24) of inoperable robotic device (16).

Thereafter, further movement of robotic device (18) horizontally along rails (22) in either direction also serves to drive inoperable robotic device (16) therewith along rails (22). In such a fashion, robotic device (18) is operable to automatically move inoperable robotic device (16) to a recovery location (not shown) where inoperable robotic device (16) may be serviced or replaced.

It should be noted that each of robotic devices (16, 18, 20) is preferably provided with the aforementioned receptacle (40), preferably at each end, in this case upper and lower ends, of its respective chassis (24). In this fashion, using an engager (34) retrieved from its portion (28, 30, 32) of library (10), any of robotic devices (16, 18, 20) may be used to retrieve any other inoperable robotic device (16, 18, 20) in an immediately adjacent portion (28, 30, 32) of library (10) in the manner described in detail above.

Figure 4:
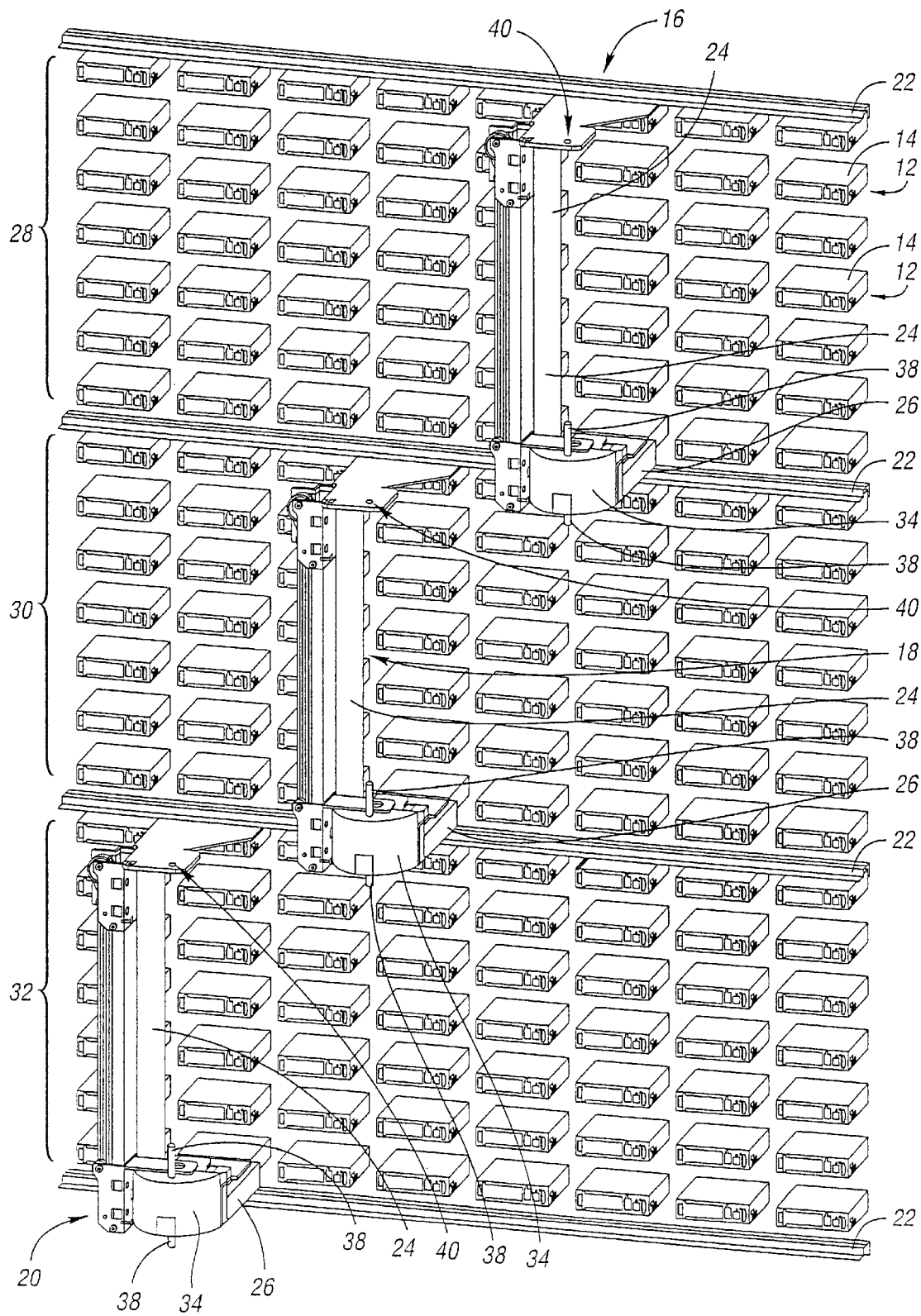
FIG. 4 is a partial perspective view of another embodiment of the present invention depicting recovery of an inoperable robotic device.

Referring now to FIG. 4, a partial perspective view of another embodiment of the system and method of the present invention is shown depicting recovery of an automated robotic device in an exemplary tape cartridge library. In this embodiment, the same reference numerals will be used to refer to the same features of the present invention depicted in FIGS. 1–3 above.

Once again, then, as seen in FIG. 4, a portion of an automated library (10) preferably includes include arrays of multiple storage cells (12) for use in housing tape cartridges (14), as well as multiple tape drives (not shown). Automated robotic devices (16, 18, 20) are preferably used to move tape cartridges (14) between various storage cells (12) and tape drives (not shown).

In that regard, guide rails (22) are preferably provided on which robotic devices (16, 18, 20) ride. Each of robotic devices (16, 18, 20) again preferably comprises a chassis (24) adapted to be mounted on rails (22) so that the robotic devices (16, 18, 20) may move along the length of rails (22), in this case substantially horizontally. Each of robotic devices (16, 18, 20) also preferably comprises a gripper (26) for grasping and holding cartridges (14). Each gripper (26) is preferably adapted to move along the length of its associated chassis (24), in this case substantially vertically. Each of robotic device (16, 18, 20) is therefore preferably movable in at least two dimensions in order to gain access to cartridges (14) in the arrays of storage cells (12).

As seen in FIG. 4, robotic device (16, 18, 20) are preferably provided access to tape cartridges (14) stored in cells (12) in separate upper, middle and lower portions (28, 30, 32), respectively, of library (10). To provide for the redundancy and increased library efficiency described above, each of upper, middle and lower portions (28, 30, 32) of library (10) may have one or more other robotic devices (not shown) in addition to robotic devices (16, 18, 20). However, as also previously described, with such redundancy, if any of robotic devices (16, 18, 20) should fail or become inoperable, that robotic device (16, 18, 20) would block access of any such additional robotic devices (not shown) to the storage cells (12) and tape cartridges (14) in that portion (28, 30, 32) of library (10). For example, if robotic device (18) were to become inoperable, any additional robotic device or devices (not shown) provided on rails (22) so as to have access to tape cartridges (14) in storage cells (12) in the middle portion (30) of library (10) would be blocked by robotic device (18) from full access to the middle portion (30) of library (10).

Alternatively, even where robotic devices (16, 18, 20) are the only such robotic devices provided for accessing the storage cells (12) and tape cartridges (14) in the upper, middle, and lower portions (28, 30, 32), respectively, of library (10), if any such robotic device (16, 18, 20) fails or becomes inoperative, the storage cells (12) and tape cartridges (14) in the corresponding portion (28, 30, 32) of library (10) become inaccessible, i.e., there is no robotic device available to access those storage cells. For example, if robotic device (18) were to become inoperable, the storage cells (12) and tape cartridges (14) in middle portion (30) of library (10) become inaccessible.

The present invention again solves this problem by providing for recovery of such an inoperable robotic device (18) by an operable robotic device (16) in an immediately adjacent portion (28) of library (10). More specifically, in this embodiment of the present invention, each gripper (26) of robotic devices (16, 18, 20) is preferably provided with an engager (34) attached thereto. As seen in FIG. 4, engager (34) preferably comprises at least one engagement member (38), which is again preferably a pin and, although not necessary, is preferably selectively extendable from and/or retractable into gripper (26) in any fashion known in the art, such as through a solenoid and spring configuration.

Figure 5:
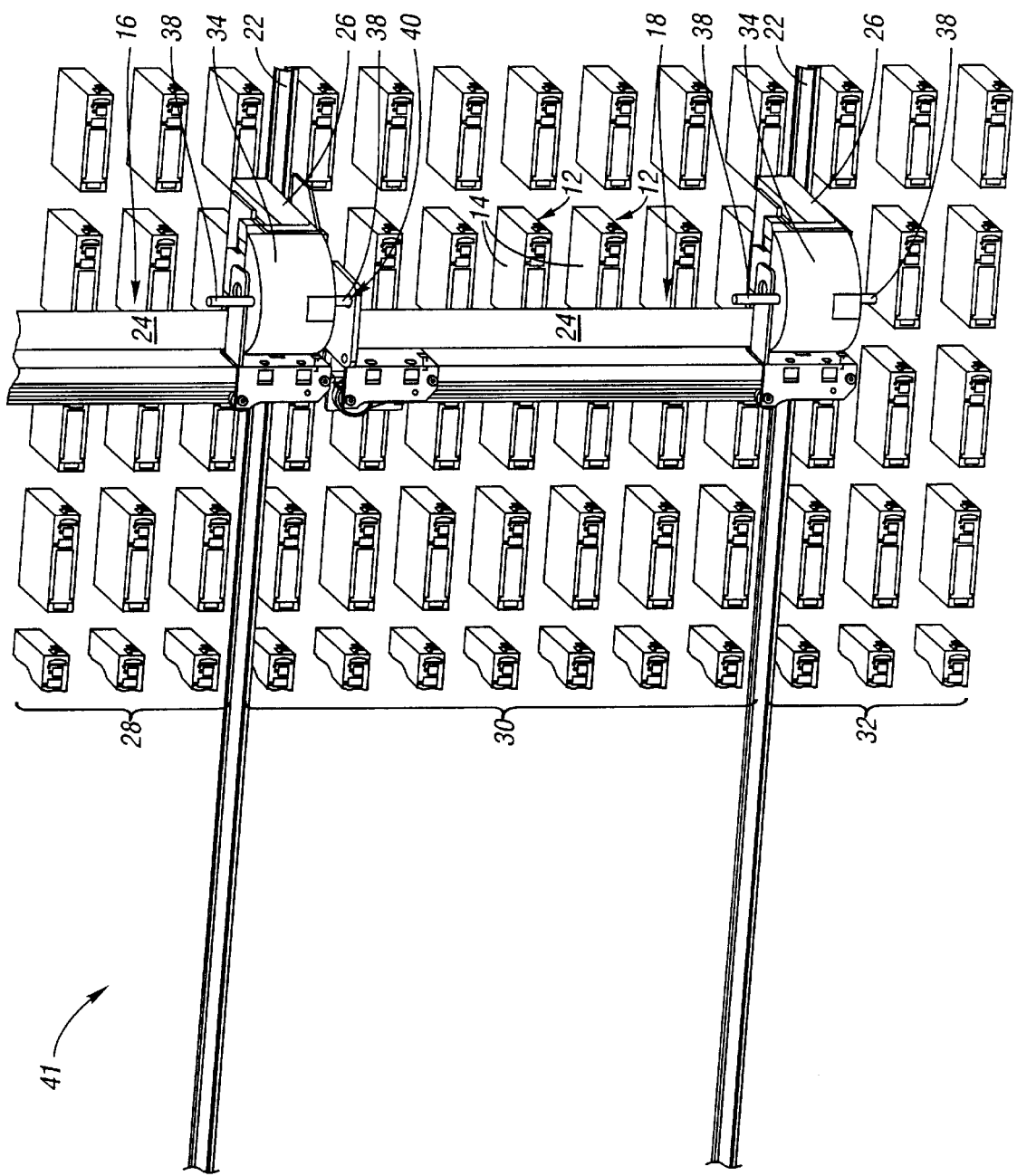
FIG. 5 is a more detailed perspective view of the embodiment of FIG. 4 depicting recovery of an inoperable robotic device according to the present invention.

In that regard, FIG. 5 shows a more detailed perspective view of the embodiment of FIG. 4, again depicting recovery of an inoperable robotic device according to the present invention. As seen therein, and with continuing reference to FIG. 4, for such recovery, chassis (24) of robotic device (16) first preferably moves horizontally along rails (22) to a position in upper portion (28) of library (10) immediately above inoperable robotic device (18) in middle portion (30) of library (10). Inoperable robotic device (18) is again preferably provided in the chassis (24) thereof with a receptacle (40), which is preferably a pin hole, adapted to receive engagement member (38) of engager (34). As a result, having the engager (34) attached thereto, gripper (26) of robotic device (16) is preferably moved vertically along its chassis (24) so that the pin (38) of engager (34) is received in the pin hole (40) in the chassis (24) of inoperable robotic device (18).

Thereafter, further movement of robotic device (16) horizontally along rails (22) in either direction also serves to drive inoperable robotic device (18) therewith along rails (22). In such a fashion, robotic device (16) is operable to automatically move inoperable robotic device (18) to a recovery location (not shown) where inoperable robotic device (18) may be serviced or replaced.

It should be noted that where pin (38) is selectively extendable and/or retractable from gripper (26), pin (38) may be held in a retracted position in gripper (26) until needed for use in recovery of an inoperable robotic device, at which time pin (38) is extended for such use. It should also be noted that, alternatively, a portion of each robotic device (16, 18, 20) other than gripper (26), such as chassis (24), could be provided with engager (34) attached thereto. In such a configuration, pin (38) would be selectively extendable and/or retractable from chassis (24) as needed for recovery of an inoperable robotic device.

Still further, it should also be noted that each gripper (26) could alternatively act as an engager. More particularly, each gripper (26) could be provided with a sufficient range of motion along chassis (24) so as to extend from its associated robotic device (16, 18, 20) and portion (28, 30, 32) of library (10) into an adjacent portion (28, 30, 32) of library (10) for recovery of an inoperable robotic device (16, 18, 20) in any manner as described in detail above. In that regard, for recovery of an inoperable robotic device (16, 18, 20), any type of engager (34) may be used as long as such an engager (34) extends from its associated robotic device (16, 18, 20) and portion (28, 30, 32) of library (10) into an adjacent portion (28, 30, 32) of library (10).

It should further be noted that, in both of the above described embodiments of the present invention, each of robotic devices (16, 18, 20) is preferably provided with a receptacle (40) at each end, in this case upper and lower ends, of its respective chassis (24). As noted above in connection with engager (34), the receptacle(s) (40) may alternatively be provided on another portion of each robotic device (16, 18, 20). In that same regard, it should still further be noted that each engager (34) preferably includes two pins (38) extending from base (36) or gripper (26) in different directions, or two pins (38) extendable from chassis (24), gripper (26) or another portion of each of robotic device (16, 18, 20) in different directions. In this fashion, using engager (34), any of robotic devices (16, 18, 20) may be used to retrieve any other inoperable robotic device (16, 18, 20) in an immediately adjacent portion (28, 30, 32) of library (10) in the manner described in detail above. Still further, as is readily apparent, where engager (34) includes two pins extendable from chassis (24) or another portion of each robotic device (16, 18, 20), one operable robotic device (18) in one portion (30) of library (10) may be used to retrieve two inoperable robotic devices (16, 20) in immediately adjacent portions (28, 32) of library (10).

Figure 6:
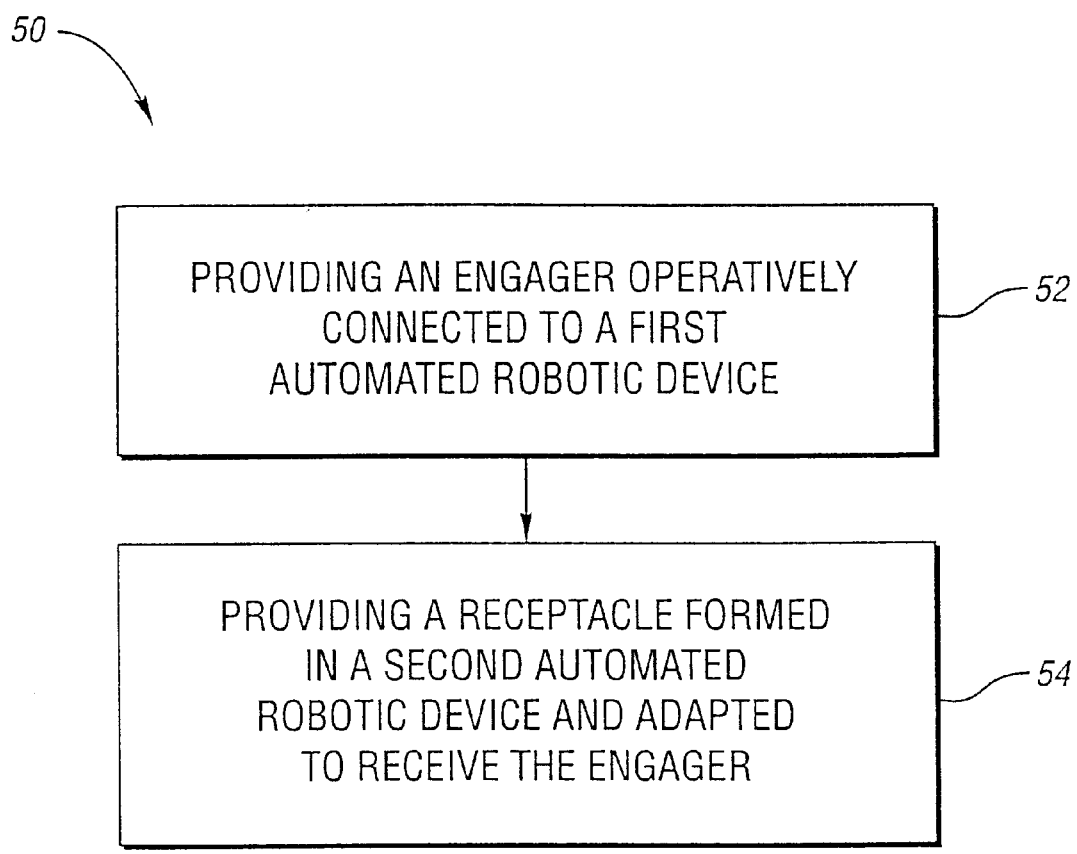
FIG. 6 is a simplified, exemplary flowchart depicting the method of the present invention.

Referring finally to FIG. 6, a simplified, exemplary flowchart depicting the method of the present invention is shown, denoted generally by reference numeral 50. As seen therein, in a data storage library having a plurality of cells for holding media cartridges for use in storing data, at least one media drive, and a plurality of automated robotic devices for use in transporting cartridges between the plurality of cells and the at least one media drive, method (50) is provided for recovering an inoperable automated robotic device. The method (50) comprises providing (52) an engager operatively connected to a first one of the plurality of automated robotic devices. When a second one of the plurality of automated robotic devices becomes inoperable, the first one of the plurality of automated robotic devices is driven to a position proximate the second one of the plurality of automated robotic devices so that the engager contacts the second one of the plurality of automated robotic devices and the first one of the plurality of automated robotic devices is operable to drive the second one of the plurality of automated robotic devices to a recovery location. The method (50) may further comprise providing a receptacle formed in the second one of the plurality of automated robotic devices and adapted to receive the engager.

As noted above in connection with FIGS. 1–3, the engager may be stored in one of the cells, and the first one of the plurality of robotic devices retrieves the engager from that cell, such as by using its gripper. The engager may comprises an engagement pin connected to a base adapted to be gripped by the gripper, and the receptacle may comprises an engagement pin hole formed in the inoperable robotic device, the engagement pin hole adapted to receive the engagement pin.

Alternatively, as noted above in connection with FIGS. 4 and 5, the engager may comprise an engagement pin attached to the gripper, chassis, or other portion of the first one of the automated robotic devices, and the receptacle may comprise an engagement pin hole formed in the chassis or other portion of the inoperable robotic device, wherein the engagement pin hole is adapted to receive the engagement pin. The engagement pin may be selectively extendable from and/or retractable into the first one of the automated robotic devices.

In both embodiments, as described in detail above, the data storage library may include a plurality of rails for use in providing the automated robotic devices access to the storage cells and media drive or drives. Still further, referring again to FIGS. 1–5, according to both the system and the method of the present invention, in either embodiment, the receptacle or receptacles (40) in the automated robotic devices (16, 18, 20) may alternatively be eliminated. In that event, again in either embodiment, the engager (34) of the operable robotic device (16) makes contact with a portion of the inoperable robotic device (18) so that the operable robotic device (16) can then drive the inoperable robotic device (18) to a recovery location (not shown). In such a configuration, as distinguished from the use of a receptacle (40), the engager (34) of the operable robotic device (16) makes contact from one side of the inoperable robotic device (18) and, without re-positioning of that engager (34) to the opposite side of the inoperable robotic device (18), the operable robotic device (16) is capable of driving the inoperable robotic device along the rails in only one direction.

It should finally be noted that the simplified flowchart depicted in FIG. 6 is exemplary of the method (50) of the present invention. In that regard, the steps of such method may be executed in sequences other than those shown, including the execution of one or more steps simultaneously.

As is readily apparent from the foregoing description, the present invention provides a system and method for recovering an inoperable automated robotic device in a data storage library. More particularly, the system and method of the present invention utilize an operative automated robotic device to engage, and thereby move and recover such an inoperable robotic device. The system and method thus allow for automated recovery of an inoperative robotic device, thereby decreasing library down-time while restoring full library function.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a data storage library having a plurality of cells for holding data storage media for use in storing data, and a plurality of automated robotic devices for use in retrieving data storage media from the plurality of cells, a system for recovering an inoperable automated robotic device, the system comprising:

an engager operatively connected to a first one of the plurality of automated robotic devices; and a receptacle formed in a second one of the plurality of automated robotic devices and adapted to receive the engager, wherein, when the second one of the plurality of automated robotic devices becomes inoperable, the first one of the plurality of automated robotic devices is driven to a position proximate the second one of the plurality of automated robotic devices so that the engager is received by the receptacle and the first one of the plurality of automated robotic devices is operable to drive the second one of the plurality of automated robotic devices to a recovery location.

2. The system of claim 1 wherein the engager is stored in one of the plurality of cells, and the first one of the plurality of robotic devices retrieves the engager from the one of the plurality of cells.

3. The system of claim 2 wherein each of the plurality of automated robotic devices includes a gripper for use in gripping data storage media, and the first one of the plurality of robotic devices retrieves the engager from the one of the plurality of cells using the gripper.

4. The system of claim 3 wherein the engager comprises an engagement pin connected to a base, the base adapted to be gripped by the gripper, and wherein the receptacle comprises an engagement pin hole formed in the second one of the plurality of automated robotic devices, the engagement pin hole adapted to receive the engagement pin.

5. The system of claim 1 wherein the engager comprises an engagement pin attached to the first one of the plurality of automated robotic devices, and the receptacle comprises an engagement pin hole formed in the second one of the plurality of automated robotic devices, the engagement pin hole adapted to receive the engagement pin.

6. The system of claim 5 wherein the engagement pin is selectively extendable from a portion of the first one of the plurality of automated robotic devices.

7. The system of claim 4 wherein the data storage library includes a plurality of rails for use in providing the plurality of automated robotic devices access to the plurality of cells, each of the plurality of automated robotic devices includes a chassis for use in supporting the gripper, the chassis having the engagement pin hole formed therein, each chassis is moveable along at least one of the plurality of rails in a first direction, and each gripper is movable along the chassis in a second direction substantially perpendicular to the first direction.

8. The system of claim 1 wherein the first automated robotic device has access to a first group of the plurality of storage cells defining a first portion of the library and the second automated robotic device has access to a second group of the plurality of storage cells defining a second portion of the library, the second portion of the library different than the first portion of the library, and wherein, when the engager is received by the receptacle, the engager extends into the second portion of the library.

9. The system of claim 5 wherein the data storage library includes a plurality of rails for use in providing the plurality of automated robotic devices access to the plurality of cells, each of the plurality of automated robotic devices includes a gripper for use in gripping the cartridges, the gripper having the engagement pin attached thereto, and a chassis for use in supporting the gripper, the chassis having the engagement pin hole formed therein, each chassis is moveable along at least one of the plurality of rails in a first direction, and each gripper is movable along the chassis in a second direction substantially perpendicular to the first direction.

10. The system of claim 9 wherein the engagement pin is selectively extendable from a portion of the gripper.

11. In a data storage library having a plurality of cells for holding data storage media for use in storing data, and a plurality of automated robotic devices for use in retrieving data storage media from the plurality of cells, a method for recovering an inoperable automated robotic device, the method comprising:

providing an engager operatively connected to a first one of the plurality of automated robotic devices, wherein, when a second one of the plurality of automated robotic devices becomes inoperable, the first one of the plurality of automated robotic devices is driven to a position proximate the second one of the plurality of automated robotic devices so that the engager contacts the second one of the plurality of automated robotic devices and the first one of the plurality of automated robotic devices is operable to drive the second one of the plurality of automated robotic devices to a recovery locations;

wherein the first automated robotic device has access to a first group of the plurality of storage cells defining a first portion of the library and the second automated robotic device has access to a second group of the plurality of storage cells defining a second portion of the library, the second portion of the library different than the first portion of the library, and wherein, when the engager contacts the second automated robotic device, the engager extends into the second portion of the library.

12. The method of claim 11 wherein the engager is stored in one of the plurality of cells, and the first one of the plurality of robotic devices retrieves the engager from the one of the plurality of cells.

13. The method of claim 12 wherein each of the plurality of automated robotic devices includes a gripper for use in gripping data storage media, and the first one of the plurality of robotic devices retrieves the engager from the one of the plurality of cells using the gripper.

14. The method of claim 13 further comprising providing a receptacle formed in the second one of the plurality of automated robotic devices and adapted to receive the engager.

15. The method of claim 14 wherein the engager comprises an engagement pin connected to a base, the base adapted to be gripped by the gripper, and wherein the receptacle comprises an engagement pin hole formed in the second one of the plurality of automated robotic devices, the engagement pin hole adapted to receive the engagement pin.

16. The method of claim 11 further comprising providing a receptacle formed in the second one of the plurality of automated robotic devices and adapted to receive the engager.

17. The method of claim 16 wherein the engager comprises an engagement pin attached to the first one of the plurality of automated robotic devices, and the receptacle comprises an engagement pin hole formed in the second one of the plurality of automated robotic devices, the engagement pin hole adapted to receive the engagement pin.

18. The method of claim 17 wherein the engagement pin is selectively extendable from a portion of the first one of the plurality of automated robotic devices.

19. The method of claim 15 wherein the data storage library includes a plurality of rails for use in providing the plurality of automated robotic devices access to the plurality of cells, each of the plurality of automated robotic devices includes a chassis for use in supporting the gripper, the chassis having the engagement pin hole formed therein, each chassis is moveable along at least one of the plurality of rails in a first direction, and each gripper is movable along the chassis in a second direction substantially perpendicular to the first direction.

20. The method of claim 17 wherein the data storage library includes a plurality of rails for use in providing the plurality of automated robotic devices access to the plurality of cells, each of the plurality of automated robotic devices includes a gripper for use in gripping the cartridges, the gripper having the engagement pin attached thereto, and a chassis for use in supporting the gripper, the chassis having the engagement pin hole formed therein, each chassis is moveable along at least one of the plurality of rails in a first direction, and each gripper is movable along the chassis in a second direction substantially perpendicular to the first direction.

21. The method of claim 20 wherein the engagement pin is selectively extendable from a portion of the gripper.

22. The method of claim 13 wherein the engager comprises an engagement pin connected to a base, the base adapted to be gripped by the gripper.

23. The method of claim 11 wherein the engager comprises an engagement pin attached to the first one of the plurality of automated robotic devices.

24. The method of claim 23 wherein the engagement pin is selectively extendable from a portion of the first one of the plurality of automated robotic devices.

25. The method of claim 21 wherein the data storage library includes a plurality of rails for use in providing the plurality of automated robotic devices access to the plurality of cells, each of the plurality of automated robotic devices includes a chassis for use in supporting the gripper, each chassis is moveable along at least one of the plurality of rails in a first direction, and each gripper is movable along the chassis in a second direction substantially perpendicular to the first direction.

26. The method of claim 22 wherein the data storage library includes a plurality of rails for use in providing the plurality of automated robotic devices access to the plurality of cells, each of the plurality of automated robotic devices includes a gripper for use in gripping the cartridges, the gripper having the engagement pin attached thereto, and a chassis for use in supporting the gripper, each chassis is moveable along at least one of the plurality of rails in a first direction, and each gripper is movable along the chassis in a second direction substantially perpendicular to the first direction.

27. The method of claim 26 wherein the engagement pin is selectively extendable from a portion of the gripper.

* * * * *